United States Patent [19]

Tsukahara et al.

[11] Patent Number: 5,776,626
[45] Date of Patent: Jul. 7, 1998

[54] HYDROGEN-OCCLUDING ALLOY AND HYDROGEN-OCCLUDING ALLOY ELECTRODE

[75] Inventors: Makoto Tsukahara; Kunio Takahashi; Takahiro Mishima; Akihito Isomura, all of Aichi-ken; Tetsuo Sakai, Osaka; Hiroshi Miyamura, Osaka; Itsuki Uehara, Osaka, all of Japan

[73] Assignees: Imra Material R&D Co., Ltd., Aichi-ken; Agency of Industrial Science and Technology, Tokyo-to, both of Japan

[21] Appl. No.: 822,043

[22] Filed: Mar. 24, 1997

Related U.S. Application Data

[62] Division of Ser. No. 410,798, Mar. 27, 1995, Pat. No. 5,690,799.

[30] Foreign Application Priority Data

Mar. 28, 1994 [JP] Japan .................................. 6-57513
Mar. 28, 1994 [JP] Japan .................................. 6-57514

[51] Int. Cl.$^6$ ................................................ H01M 10/34
[52] U.S. Cl. .......................... 429/59; 429/94; 429/101; 420/900; 420/420; 204/293
[58] Field of Search .......................... 420/900, 420; 429/59, 101, 94; 204/293

[56] References Cited

U.S. PATENT DOCUMENTS

| | | | |
|---|---|---|---|
| 4,160,014 | 7/1979 | Gamo et al. | 423/644 |
| 4,195,989 | 4/1980 | Gamo et al. | 75/175.5 |
| 4,440,736 | 4/1984 | Maeland et al. | 423/644 |
| 4,440,737 | 4/1984 | Libowitz et al. | 423/644 |
| 4,551,400 | 11/1985 | Sapru et al. | 429/94 |
| 4,728,586 | 3/1988 | Venkatesan et al. | 429/94 |
| 4,849,205 | 7/1989 | Hong | 423/644 |
| 5,002,730 | 3/1991 | Fetcenko | 420/424 |
| 5,238,756 | 8/1993 | Fetcenko et al. | 429/59 |
| 5,277,999 | 1/1994 | Ovshinsky et al. | 429/59 |

OTHER PUBLICATIONS

Justi et al, *Energy Conversion*, 10: 183–187 (1970) no month available.

Kagawa et al, *Journal of the Less–Common Metals*, 172–174: 64–70 (1991) no month available.

Hirota et al, *Electrochemical Society Proceedings*, 92–5: 210–219 (1992) no month available.

*Primary Examiner*—Bruce F. Bell
*Attorney, Agent, or Firm*—Timothy R. Kroboth

[57] ABSTRACT

Disclosed are a hydrogen-occluding alloy electrode comprising an alloy powder wherein the alloy comprises a Ti-V solid solution mother phase and a secondary phase predominantly containing a Ti-Ni phase or an $AB_2$ Laves phase in which the secondary phase forms a three-dimensional reticulate skeleton in the alloy; said hydrogen-occluding alloy powder surface-treated with hydrofluoric acid, to provide a titanium hydride surface and surface-coated with at least one metal of Ni, Cu and Co.

6 Claims, 1 Drawing Sheet

5,776,626

1

HYDROGEN-OCCLUDING ALLOY AND HYDROGEN-OCCLUDING ALLOY ELECTRODE

This is a division of application Ser. No. 08/410,798 filed on Mar. 27, 1995 now U.S. Pat. No. 5,690,799.

TECHNICAL FIELD

The present invention relates to a novel hydrogen-occluding alloy and a hydrogen-occluding alloy electrode.

BACKGROUND ART

Hydrogen-occluding alloys are capable of reversibly occluding and releasing a large amount of hydrogen and are expected to find wide applications as a material for retaining hydrogen gas, as a material for a heat-utilizing system such as a heat pump, as a material for the negative electrode of a nickel-hydrogen battery, etc.

Various hydrogen-occluding alloys are known and include, for example, $AB_5$ alloys such as $LaNi_5$, $AB_2$ Laves phase alloys such as $ZrMn_2$, AB alloys such as TiFe, $A_2B$ alloys such as $Mg_2Ni$, solid solution alloys such as Ti-V, etc. Among them, solid solution alloys have the advantages of occluding a very large amount of hydrogen and being beneficial in costs compared with other alloys.

However, the solid solution alloys have a short cycle life in repeatedly occluding and releasing hydrogen, and are relatively slow in the progress of electrochemical reaction when used as a material for the negative electrode of a nickel-hydrogen battery. That is, the solid solution alloys remain to be improved in these respects.

The main object of the present invention is to provide a hydrogen-occluding alloy which has excellent hydrogen-occluding properties and which is suitable as a material for the negative electrode of a battery.

SUMMARY OF THE INVENTION

To overcome the foregoing prior art problems, the present inventor added nickel to a Ti-V solid solution alloy in an attempt to promote the electrochemical reaction of the Ti-V solid solution alloy and to improve the hydrogen-occluding properties. But the inventor found that when nickel alone is added, for example, in preparing an alloy for use as a material for the negative electrode of a nickel-hydrogen battery, vanadium is dissolved to a marked extent in an electrolytic solution, resulting in a short cycle life, a low electrical capacity and unsatisfactory improvements of said properties.

In view of the above results, the inventor added a specific element, in combination with nickel, to the alloy and obtained a hydrogen-occluding alloy having a specific structure heretofore unknown. The inventor found that the obtained alloy is much improved in the cycle life, electrical capacity and hydrogen-occluding properties. The inventor has accomplished the present invention based on this finding.

The present invention provides:

(1) a hydrogen-occluding alloy comprising a Ti-V solid solution mother phase and a secondary phase predominantly containing a Ti-Ni phase, said secondary phase forming a three-dimensional reticulate skeleton in the alloy (hereinafter called "first invention"), and (2) a hydrogen-occluding alloy comprising a Ti-V solid solution mother phase and a secondary phase predomi-

2 nantly containing an $AB_2$ Laves phase, said secondary phase forming a three-dimensional reticulate skeleton in the alloy (hereinafter called "second invention").

DETAILED DESCRIPTION OF THE INVENTION

The hydrogen-occluding alloy of the first invention has a specific structure wherein the alloy of the first invention, as described above, comprises a Ti-V solid solution mother phase and a secondary phase predominantly containing a Ti-Ni phase, said secondary phase forming a three-dimensional reticulate-skeleton in the alloy.

Said hydrogen-occluding alloy preferably has the formulation $TiV\alpha Ni\beta M\gamma$ wherein M is at least one element selected from the group consisting of Cr, Mn, Fe, Co, Cu and Nb. If the alloy lacks at least one of these elements (M), namely is a three-component alloy ($TiV\alpha Ni\beta$), the secondary phase having a three-dimensional reticulate skeleton would be unlikely to be precipitated. Thus the absence of M is undesirable. The alloy of the first invention may contain other elements than those set forth above insofar as their presence does not suppress the intended effects of the invention. In the formula, preferably $1 \leq \alpha \leq 10$, $0.2 \leq \beta \leq 2$, and $0.02 \leq \gamma \leq 0.5$. Even any one of $\alpha$, $\beta$ and $\gamma$ outside said numerical range tends to reduce the amount of occluded hydrogen or not to provide the secondary phase predominantly containing the Ti-Ni phase with a three-dimensional reticulate skeleton. Hence it is undesirable.

The secondary phase predominantly containing the Ti-Ni phase in the alloy of the present invention (first invention) has the formulation $TiNi\delta N\epsilon$ wherein N is at least one element selected from the group consisting of V, Cr, Mn, Fe, Co, Cu and Nb. If the secondary phase lacks at least one of these elements, for example, in use as a material for the negative electrode of a nickel-hydrogen battery, Ti in the secondary phase is excessively dissolved out. Hence it is undesirable. On the other hand, the alloy may contain other elements than those set forth above insofar as their presence does not adversely affect the intended effects of the invention. In the formula, preferably $0.5 \leq \delta \leq 2$ and $0.1 \leq \epsilon \leq 1$. Any one of them outside said numerical range decreases the durability due to the degradation of ductility or inhibits the hydrogen-occluding reaction. Hence it is undesirable.

The secondary phase of the first invention has a three-dimensional reticulate skeleton in the alloy, encapsulating the Ti-V solid solution mother phase. The volume proportion of the secondary phase in the alloy varies, depending on the composition of the alloy, the conditions for the production, etc. and may be properly selected according to the use of the present alloy and other factors.

The hydrogen-occluding alloy of the second invention has a specific structure wherein the alloy of the second invention, as described above, comprises a Ti-V solid solution mother phase and a secondary phase predominantly containing an $AB_2$ Laves phase, said secondary phase forming a three-dimensional reticulate skeleton in the alloy.

The hydrogen-occluding alloy of the second invention preferably has the formulation $TiV\zeta Ni\eta A\theta M\iota$ wherein A is at least one element selected from the group consisting of Zr, Hf and Ta. If the alloy lacks at least one of these elements (A), the secondary phase having a three-dimensional reticulate skeleton would be unlikely to be precipitated. Thus the absence of A is undesirable. In the formula, M is at least one element selected from the group consisting of Cr, Mn, Fe, Co, Cu and Nb. The alloy of the second invention may contain other elements than those set forth above insofar as their presence does not reduce the intended effects of the invention. In the formulation, preferably $1 \leq \zeta \leq 10$, $0.2 \leq \eta \leq 2$, $0.05 \leq \theta \leq 1$, and $0 \leq \iota \leq 2$. Even any one of $\zeta$, $\eta$, $\theta$ and $\iota$ present outside said numerical range tends to reduce the amount of occluded hydrogen or not to form the secondary phase predominantly containing an $AB_2$ Laves phase with a three-dimensional reticulate skeleton. Hence it is undesirable.

The second invention includes a hydrogen-occluding alloy of $TiV\zeta Ni\eta A\theta M\iota$ wherein $\iota$ is zero, namely a hydrogen-occluding alloy of $TiVoNi\pi Ap$ wherein A is at least one element selected from the group consisting of Zr, Hf and Ta, and $1 \leq o \leq 10$, $0.2 \leq \pi \leq 2$, and $0.05 \leq p \leq 1$.

The secondary phase predominantly containing the $AB_2$ Laves phase has the formulation $Ti\kappa A\lambda Ni\mu Vv M\xi$ wherein A is at least one element selected from the group consisting of Zr, Hf and Ta. The absence of these elements tends not to form the secondary phase and is, therefore, undesirable. In the formula, M is at least one element selected from the group consisting of Cr, Mn, Fe, Co, Cu and Nb. The alloy may contain other elements than those set forth above insofar as their presence does not adversely affect the intended effects of the invention. In the formula, preferably $0.1 \leq \kappa \leq 0.4$, $0.1 \leq \lambda \leq 0.4$, $0.1 \leq \mu \leq 0.6$, $0.1 \leq v \leq 0.5$, $0 \leq \xi \leq 0.2$, and $\kappa+\lambda+\mu+v+\xi=1$. Any one of them outside said numerical range is likely to decrease the durability or to inhibit the hydrogen-occluding reaction. Hence it is undesirable.

The second invention includes a hydrogen-occluding alloy containing the secondary phase predominantly containing the $AB_2$ Laves phase of $Ti\kappa A\lambda Ni\mu Vv M\xi$ wherein $\xi$ is zero, namely $Ti\sigma A\tau Niv V\phi$ wherein A is at least one element selected from the group consisting of Zr, Hf and Ta, and $0.1 \leq \sigma \leq 0.4$, $0.1 \leq \tau \leq 0.4$, $0.1 \leq v \leq 0.6$, $0.1 \leq \phi \leq 0.5$, and $\sigma+\tau+v+\phi=1$.

In the secondary phase of the second invention, the content of the $AB_2$ Laves phase is usually at least 5% by volume and the balance may contain other phases.

The secondary phase of the second invention has a three-dimensional reticulate skeleton formed in the alloy of $TiV\zeta Ni\eta A\theta M\iota$, encapsulating the solid solution mother phase. The volume proportion of the secondary phase in the alloy varies depending on the composition of the alloy, the conditions for the production, etc. and may be properly selected according to the use of the alloy and other factors.

The hydrogen-occluding alloy of the first invention or the second invention can be prepared by thermally fusing a powder material of $TiV\alpha Ni\beta M\gamma$ or $TiV\zeta Ni\eta A\theta M\iota$ by conventional methods such as an arc melting method and cooling the melt. Powder materials to be used include those commercially available which can be used without any treatment. When required, additives capable of removing oxides from a melt such as $CaB_6$ can be added.

When the hydrogen-occluding alloy of the first or second invention is used for preparing an electrode, the alloy powder is preferably surface-treated with an aqueous solution containing hydrofluoric acid (HF). Such treatment can effectively remove a passive oxide layer of titanium formed on the alloy surface and form titanium hydride which is a good conductor on the alloy surface, preventing reoxidation of the alloy. The alloy powder is, for example, surface-treated by its immersion in a 1 to 5% aqueous solution of hydrofluoric acid at a temperature of about 20° to 30° C. for about 20 to 60 seconds. The treating conditions may be suitably varied with the composition of the alloy, etc.

Further the thus surface-treated alloy powder may be coated with metals to increase surface conductivity. In this case, a metallic coating is formed on the surface of the alloy powder by applying at least one metal of copper, nickel and cobalt by conventional plating methods such as chemical plating, electroplating and other plating methods. The amount of the metallic deposit may be suitably varied with the characteristics, use and other factors of the desired batteries but is usally about 10 to 30% by weight.

The hydrogen-occluding alloy electrode for evaluation is prepared from the hydrogen-occluding alloy of the first or second invention as follows. For example, the electrode can be made by mixing an alloy powder of $TiV\alpha Ni\beta M\gamma$ or $TiV\zeta Ni\eta A\theta M\iota$ with a copper powder or the like and press-molding the mixture into a desired shape. The content of the hydrogen-occluding alloy is about 20 to 80% by weight.

Electrodes for practical use can be produced as follows. For example, an alloy powder is mixed with 1% by weight of an aqueous solution of polyvinyl alcohol to give a paste. Then the paste is packed into a fibrous nickel substrate or a foamed nickel substrate with a porosity of about 94 to 97%. After drying, the alloy-packed substrate is pressed into a sheet, providing a porous nickel-type electrode. On the other hand, an alloy powder is mixed with about 10 to 40% by weight of a conductive auxiliary agent comprising at least one of nickel, copper, cobalt and carbon powders, and with about 2 to 6% by weight of a polymeric binder such as polytetrafluoroethylene and is kneaded therewith. The blend is made into a sheet and the sheet is bonded to a nickel mesh collector by contact bonding, giving a polymer-bonded type electrode.

When required, these electrodes may be treated with an alkali solution according to the present invention in order to remove the vanadium which is dissolved into a KOH electrolyte during cycles and deposited on the nickel electrode, causing capacity decay of the nickel-metal hydride battery during cycles. The alkali solution treatment is performed by dipping the electrode in a 5–8M solution of sodium hydroxide, potassium hydroxide or the like at about 100° to 120° C. for about 1 to 2 hours, dissolving out the vanadium from the alloy surface.

In the hydrogen-occluding alloys of the first and second inventions, each secondary phase with the three-dimensional reticular skeleton exists in the alloy. The secondary phase en-microcapsulates the Ti-V solid solution mother phase. This skeleton structure effectively prevents the decrepitation of the alloy which would occur during charge-discharge cycles of hydrogen.

When the hydrogen-occluding alloy of the present invention is used as a material for an electrode, the secondary phase serves as a protective film for suppressing the dissolution of vanadium from the alloy, whereby the alkali resistance of the alloy is improved, consequently leading to the extension of cycle life. Further the secondary phase also works as an electro-catalyst and current collector, increasing the rate of capability of the alloy electrodes.

EXAMPLES

The present invention will be clarified below with reference to the following examples.

Example 1

Figure 1:
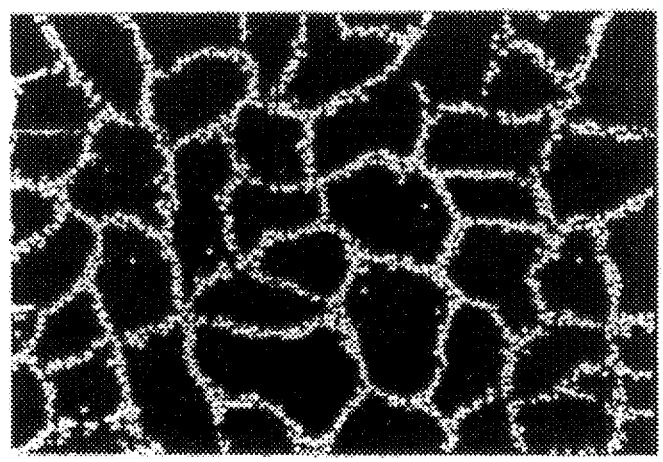
FIG. 1 shows the microstructure of the hydrogen-occluding alloy of first invention (EXAMPLE 1, $TiV_3Ni_{0.56}Co_{0.05}$) as observed with a scanning electron microscope.

Commercially available Ti, V, Ni and Co were weighed out to provide a mixture of formulation $TiV_3Ni_{0.56}Co_{0.05}$. An alloy was prepared by thermally fusing the mixture by an arc melting method. The obtained alloy was buried in a resin and polished in order to provide a smooth surface of the alloy cross section. The microstructure on the cross section was examined by scanning electron microscopy (SEM) and electron probe X-ray microanalysis (EPMA). FIG. 1 shows a SEM photograph of cross section of the alloy.

As a result, it was confirmed that the secondary phase of $TiNiV_{0.30}Co_{0.06}$ predominantly containing a Ti-Ni phase (white portion) was precipitated along the grain boundary of a Ti-V solid solution mother phase of $TiV_{4.27}Ni_{0.42}Co_{0.05}$, forming a three-dimensional reticulate skeleton in the alloy.

Example 2

Commercially available Ti, V, Ni and Nb were weighed out to provide a mixture of formulation $TiV_3Ni_{0.56}Nb_{0.05}$. An alloy was prepared by thermally fusing the mixture by an arc melting method. The obtained alloy was buried in a resin and polished in order to provide a smooth surface of the alloy cross section. The microstructure on the alloy cross section was examined by SEM and EPMA.

As a result, it was confirmed that an alloy phase of $TiNi_{1.10}V_{0.33}Nb_{0.04}$ predominantly containing a Ti-Ni phase was precipitated along the grain boundary of a Ti-V solid solution mother phase of $TiV_{4.78}Ni_{0.42}Nb_{0.29}$, forming a three-dimensional reticulate skeleton in the alloy.

Example 3

The compositions and electrical capacities of the alloys of the first invention are shown below in Table 1 (Samples Nos. 1 to 15). Then, the test electrodes for evaluating the alloys were prepared as follows.

A 0.2 g quantity of each of alloy powders having the compositions of Samples Nos. 1 to 15 was mixed with 0.6 g of electrolytic copper powder. The mixture was pelletized by pressing into pellets of 13 mm in diameter. The pellets were sandwiched by nickel mesh, providing alloy electrodes. The alloy electrodes were evaluated in a half cell using a Hg/HgO reference electrode, a nickel hydroxide electrode as a counter electrode, and a 6M aqueous solution of potassium hydroxide as an electrolyte solution. The alloy electrodes were subjected to a cycle test wherein one cycle comprises charging the electrode with a current at 100 mA/g for 5 hours and discharging the electrode at 50 mA/g to cut-off voltage of −0.7 V vs. Hg/HgO. The maximum electrical capacity and capacity retention after 100 cycles are shown in Table 1.

TABLE 1

| No. | Composition (Sample) | Maximum Electrical Capacity [Ah/kg] | Capacity Retention after 100 Cycles [%] |
|---|---|---|---|
| 1 | $TiV_3Ni_{0.56}Cr_{0.05}$ | 380 | 91 |
| 2 | $TiV_3Ni_{0.56}Mn_{0.05}$ | 390 | 76 |
| 3 | $TiV_3Ni_{0.56}Fe_{0.05}$ | 340 | 87 |
| 4 | $TiV_3Ni_{0.56}Co_{0.05}$ | 430 | 85 |
| 5 | $TiV_3Ni_{0.56}Cu_{0.05}$ | 410 | 71 |
| 6 | $TiV_3Ni_{0.56}Nb_{0.05}$ | 380 | 95 |
| 7 | $TiV_3Ni_{0.56}Co_{0.1}$ | 410 | 86 |
| 8 | $TiV_3Ni_{0.56}Co_{0.2}$ | 380 | 90 |
| 9 | $TiV_3Ni_{0.56}Co_{0.5}$ | 340 | 91 |

TABLE 1-continued

| No. | Composition (Sample) | Maximum Electrical Capacity [Ah/kg] | Capacity Retention after 100 Cycles [%] |
|---|---|---|---|
| 10 | $TiV_3NiNb_{0.05}$ | 360 | 96 |
| 11 | $TiV_3Ni_{1.5}Nb_{0.05}$ | 340 | 98 |
| 12 | $TiV_3Ni_{2.0}Nb_{0.05}$ | 330 | 98 |
| 13 | $TiVNi_{0.56}Cu_{0.05}$ | 370 | 78 |
| 14 | $TiV_5Ni_{0.56}Cu_{0.05}$ | 420 | 66 |
| 15 | $TiV_{10}Ni_{0.56}Cu_{0.05}$ | 440 | 61 |
| 16 | $TiV_3Ni_{0.56}Zr_{0.05}$ | 400 | 72 |
| 17 | $TiV_3Ni_{0.56}Hf_{0.05}$ | 420 | 68 |
| 18 | $TiV_3Ni_{0.56}Ta_{0.05}$ | 390 | 81 |
| 19 | $TiV_3Ni_{0.56}Zr_{0.1}$ | 370 | 74 |
| 20 | $TiV_3Ni_{0.56}Zr_{0.5}$ | 350 | 76 |
| 21 | $TiV_3Ni_{0.56}Zr$ | 330 | 77 |
| 22 | $TiV_3NiHf_{0.05}$ | 390 | 70 |
| 23 | $TiV_3Ni_{1.5}Hf_{0.05}$ | 360 | 71 |
| 24 | $TiV_3Ni_2Hf_{0.05}$ | 320 | 75 |
| 25 | $TiVNi_{0.56}Ta_{0.05}$ | 370 | 83 |
| 26 | $TiV_5Ni_{0.56}Ta_{0.05}$ | 410 | 75 |
| 27 | $TiV_{10}Ni_{0.56}Ta_{0.05}$ | 420 | 69 |
| Comparative Sample | | | |
| 28 | $TiV_3Ni_{0.25}$ | 60 | 7 |
| 29 | $TiV_5Ni_{0.25}$ | 90 | 0 |
| 30 | $TiV_3Ni$ | 310 | 15 |

Example 4

Figure 2:
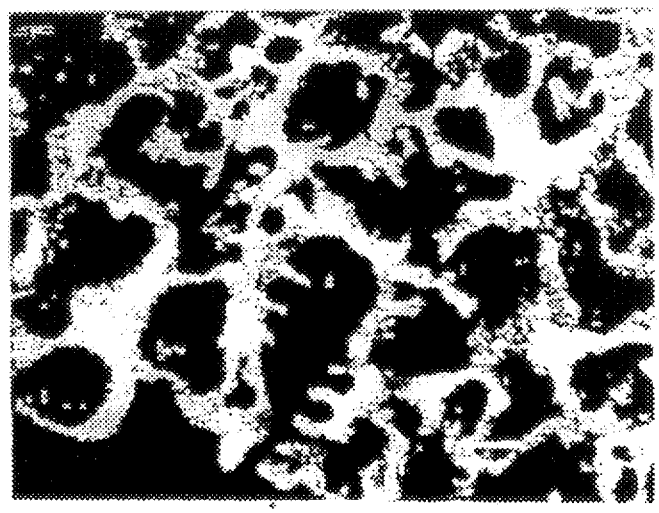
FIG. 2 shows the microstructure of the hydrogen-occluding alloy of second invention (EXAMPLE 4, $TiV_3Ni_{0.56}Zr_{0.05}$ as observed with a scanning electron microscope.

Commercially available Ti, V, Ni and Zr were weighed out to provide a mixture of formulation $TiV_3Ni_{0.56}Zr_{0.05}$. An alloy was prepared by thermally fusing the mixture by an arc melting method. The obtained alloy was buried in a resin and polished in order to provide a smooth surface of the alloy cross section. The microstructure of the cross section was examined by SEM and EPMA. FIG. 2 shows the SEM photograph of cross section of the alloy.

As a result, it was confirmed that an alloy phase of of $Ti_{0.25}Zr_{0.16}Ni_{0.32}V_{0.27}$ predominantly containing an $AB_2$ Laves phase (white portion) was precipitated on the grain boundary of a Ti-V solid solution mother phase of $TiV_{5.76}Ni_{0.32}Zr_{0.02}$, forming a three-dimensional reticulate skeleton in the alloy.

Example 5

Commercially available Ti, V, Ni and Hf were weighed out to provide a mixture of formulation $TiV_3Ni_{0.56}Hf_{0.24}$. An alloy was prepared by thermally fusing the mixture by an arc melting method. The obtained alloy was buried in a resin and polished in order to provide a smooth surface of the cross section. The microstructure of the cross section was examined by SEM and EPMA.

As a result, it was confirmed that the alloy phase of $Ti_{0.25}Hf_{0.18}Ni_{0.29}V_{0.28}$ predominantly containing $AB_2$ Laves phase was precipitated on the grain boundary of a Ti-V solid solution mother phase of $TiV_{5.34}Ni_{0.30}Hf_{0.09}$, forming a three-dimensional reticulate skeleton in the alloy.

Example 6

The compositions and electrical capacities of the alloys of the second invention are shown below in Table 1 (Samples Nos. 16 to 27). Then, the test electrodes for evaluating the alloys were prepared as follows.

A 0.2 g quantity of each of alloy powders having the compositions of Samples Nos. 16 to 27 was mixed with 0.6 g of electrolytic copper powder. The mixture was pelletized by pressing into pellets of 13 mm in diameter. The pellets were sandwiched by nickel mesh, providing alloy electrodes. The alloy electrodes were evaluated in a half cell using a Hg/HgO reference electrode, a nickel hydroxide electrode as a counter electrode, and a 6M aqueous solution of potassium hydroxide as an electrolyte solution. The alloy electrodes were subjected to a cycle test wherein one cycle comprises charging the electrode with a current at 100 mA/g for 5 hours and discharging the electrode at 50 mA/g to cut-off voltage of −0.7 V vs. Hg/HgO. The maximum electrical capacity and capacity retention after 100 cycles are shown in Table 1.

For comparison, electrodes (Comparative Samples Nos. 28 to 31) were produced in the same manner as above using alloy powders which were different in the composition from the alloys of the invention. The comparative samples were subjected to the same cycle test. The results are also shown in Table 1.

Example 7

Using the alloy powder as Sample No.6 (TiV$_3$Ni$_{0.56}$Nb$_{0.05}$) prepared in EXAMPLE 3 (100 mesh or less), the following two types of electrodes for practical use were produced.

(1) Porous nickel-type electrode

The alloy powder was mixed with 1% by weight of an aqueous solution of polyvinyl alcohol to give a paste. Then the paste was packed into a foamed nickel substrate with a porosity of about 94 to 97%. After drying, the alloy-packed substrate was pressed into a sheet, providing a porous nickel-type electrode.

(2) Polymer-bonded type electrode

The alloy powder was mixed with about 30% by weight of a conductive auxiliary agent of nickel powder, and with about 5% by weight of polytetrafluoroethylene as a binder and was kneaded therewith. The blend was made into a sheet and the sheet was bonded to a nickel mesh collector by contact bonding, giving a polymer-bonded type electrode.

The practical electrodes thus obtained were evaluated in the same manner as in EXAMPLE 3 and were found to have an extremely low capacity, i.e. 20 to 30% of the maximum electrical capacity obtained for the test electrode (Sample No.6 in Table 1).

Then said alloy powder was dipped in a 3% aqueous solution of hydrofluoric acid at 20° C. for 40 seconds in order to remove the surface passive layer of titanium oxide and form titanium hydride. Using the thus surface-treated alloy powder, the foregoing two types of practical electrodes were produced. The obtained electrodes exhibited much improved capacity, i.e., 40 to 60% of the maximum electrical capacities. It was found that an oxidized layer of titanium on the alloy surface was removed and replaced with a titanium hydride layer, preventing re-oxidation.

A copper coating (20 wt.%) was conducted by a chemical plating method on the surface-treated alloy powder. Practical electrodes prepared using the thus copper-plated alloy powder had a much higher capacity, i.e., 85 to 95% of the expected capacities.

These practical electrodes showed volume energy densities of 1500 to 1700 mAh/cm$^3$ which were 30 to 40% higher energy densities than that of electrodes prepared using rare earth based alloys (e.g. MmNi$_{3.5}$Co$_{0.8}$Mn$_{0.4}$Al$_{0.3}$) (1100 to 1200 mAh/cm$^3$).

As described above, the treatment of the present alloy powder as done above can enhance the characteristics of electrodes for use. Especially, the porous nickel-type electrodes produced from the alloy powders of the invention are excellent in high-rate discharge ability while the polymer-bonded type electrodes produced from them are excellent in cycle life. Thus a suitable electrode can be selected from the two types of electrodes according to the intended purpose.

Example 8

A sub-C size sealed battery (3.2 Ah) was prepared using (i) an alloy electrode produced from the surface-treated and copper-plated alloy powder of EXAMPLE 7 as a negative electrode; (ii) a nickel electrode produced by pressing a foamed nickel substrate filled with a mixture of a nickel hydroxide powder containing both Zn and Co and a 10 wt. % cobalt monoxide powder as a positive electrode; and (iii) a non-woven cloth of polypropylene of 0.2 mm thickness with hydrophilic properties as a separator.

The battery thus produced was subjected to a cycle test wherein one cycle comprises charging the battery with a current at 0.3A for 13 hours and discharging at 0.6A to 0.8 V. As a result, the electrical capacity decreased to 30% the initial capacity after 300 cycles. The battery was disassembled to find out the cause for the decrease of electrical capacity. The cause was presumably as follows. A small amount of vanadium was dissolved out from the alloy surface and passed through the separator, whereby oxidative compounds of vanadium were precipitated on the surface of positive electrode. The vanadium component thus behaved to reduce the charging efficiency and increased the internal pressure due to the generation of oxygen gas, thereby lowering the electrical capacity of the positive electrode.

The electrode of EXAMPLE 7 was dipped in a 6M aqueous solution of potassium hydroxide at 100° to 120° C. for 1 hour to dissolve out the vanadium from the alloy surface. Using the alkaline-treated electrode, a battery was constructed in the same manner as above, and the obtained battery was sujected to the same cycle test. After 300 cycles, at least 80% of the initial service capapcity was retained. In this way, the battery obtained from the electrode of the invention treated with the alkali solution provided a high electrical capacity and a longer cycle life.

What we claim is:

1. A hydrogen-occluding alloy electrode comprising an alloy powder wherein the alloy comprises a Ti-V solid solution mother phase and a secondary phase predominantly containing an AB$_2$ Laves phase, said alloy having the formulation TiV$_o$Ni$_\pi$A$_\rho$, wherein A is at least one element selected from the group consisting of Zr, Hf and Ta, and $1 \leq o \leq 10$, $0.2 \leq \pi \leq 2$ and $0.05 \leq \rho \leq 1$, provided that in all cases A includes Hf.

2. A hydrogen-occluding alloy electrode according to claim 1, wherein the secondary phase predominantly containing the AB$_2$ Laves phase has the formulation Ti$_\sigma$A$_\tau$Ni$_\upsilon$V$_\phi$ wherein A is at least one element selected from the group consisting of Zr, Hf and Ta, and $0.1 \leq \sigma \leq 0.4$, $0.1 \leq \tau \leq 0.4$, $0.1 \leq \upsilon \leq 0.6$, $0.1 \leq \phi \leq 0.5$ and $\sigma+\tau+\upsilon+\phi=1$, provided that in all cases A includes Hf.

3. The electrode of claim 1, the alloy powder having been surface-treated with hydrofluoric acid.

4. The electrode of claim 3, comprising a metallic coating of at least one of Ni, Cu and Co, on the surface-treated alloy powder.

5. The electrode of claim 1, the alloy powder having a titanium hydride surface.

6. The electrode of claim 5, comprising a metallic coating of at least one of Ni, Cu and Co, on the titanium hydride surface of the alloy powder.

* * * * *